(12) United States Patent  
Munro

(10) Patent No.: US 7,847,886 B2  
(45) Date of Patent: Dec. 7, 2010

(54) PARABOLIC LENTICULAR COLLIMATING FILMS AND METHODS THEREOF

(75) Inventor: James F. Munro, Walworth, NY (US)

(73) Assignee: Reflexite Corporation, Avon, CT (US)

( * ) Notice: Subject to any disclaimer, the term of this patent is extended or adjusted under 35 U.S.C. 154(b) by 149 days.

(21) Appl. No.: 12/286,764

(22) Filed: Oct. 2, 2008

(65) Prior Publication Data

US 2009/0180058 A1 Jul. 16, 2009

Related U.S. Application Data

(60) Provisional application No. 60/997,442, filed on Oct. 3, 2007.

(51) Int. Cl.  
*G02F 1/335* (2006.01)  
*G02B 27/10* (2006.01)  
*G02B 27/30* (2006.01)

(52) U.S. Cl. .................... 349/95; 349/96; 349/187; 359/628; 359/641

(58) Field of Classification Search ............ 349/95, 349/96, 87, 187, 193, 200; 359/628, 641  
See application file for complete search history.

(56) References Cited

U.S. PATENT DOCUMENTS

| | | | | |
|---|---|---|---|---|
| 5,353,133 A | * | 10/1994 | Bernkopf | 349/5 |
| 6,266,108 B1 | * | 7/2001 | Bao et al. | 349/63 |
| 6,570,710 B1 | * | 5/2003 | Nilsen et al. | 359/625 |
| 7,345,824 B2 | * | 3/2008 | Lubart et al. | 359/641 |
| 2005/0259198 A1 | * | 11/2005 | Lubart et al. | 349/113 |
| 2009/0180058 A1 | * | 7/2009 | Munro | 349/95 |

* cited by examiner

*Primary Examiner*—Brian M Healy  
(74) *Attorney, Agent, or Firm*—Nixon Peabody LLP

(57) ABSTRACT

A parabolic lenticular collimating film system includes at least one film which is at least partially transmissive and one or more parabolic structures on a surface of the film.

12 Claims, 5 Drawing Sheets

PARABOLIC LENTICULAR PROFILE OF $Z = 48X^2$

US 7,847,886 B2

PARABOLIC LENTICULAR COLLIMATING FILMS AND METHODS THEREOF

This application claims the benefit of U.S. Provisional Patent Application Ser. No. 60/997,442, filed Oct. 3, 2007, which is herein incorporated by reference in its entirety.

FIELD OF THE INVENTION

This invention generally relates to collimating films and, more particularly, to parabolic lenticular collimating films and methods thereof.

BACKGROUND

Backlighting helps to improve the readability and the color gamut of a display, such as an LCD display. The amount of improvement is at least partially based on the emitted intensity profile of the backlighting so designers look for ways to improve this intensity.

One prior solution has been to place a film containing prisms on the output side of a backlight. This film effectively increases the on-axis brightness of the backlight, at the expense of the lower-valued light that is emitted obliquely and a harsh transition between them. Unfortunately, the emission profile from a prism film is not ideal for all types of displays. For example, the ideal emission characteristics of an LCD television are somewhat broader and having a softer intensity roll-off than that for an LCD display for a laptop computer.

SUMMARY

A collimating film system in accordance with embodiments of the present invention includes at least one film which is at least partially transmissive and has one or more parabolic structures on a surface of the film.

A display system in accordance with other embodiments of the present invention includes at least one backlight source, at least one film which is at least partially transmissive, and at least one display panel. The film is adjacent the backlight source and has a surface with one or more parabolic structures and the display panel is adjacent the at least one film.

A method for making a collimating film system in accordance with other embodiments of the present invention includes providing at least one film which is at least partially transmissive and forming one or more parabolic structures on a surface of the film.

A method of making a display system in accordance with other embodiments of the present invention includes positioning at least one film which is at least partially transmissive adjacent a backlight source and positioning at least one display panel adjacent the at least one film. The film has a surface with one or more parabolic structures.

The present invention provides a number of advantages including providing a collimating film which efficiently produces an emission profile suitable for several types of applications, such as LCD televisions, where prism films have been deficient.

DETAILED DESCRIPTION

Figure 1:
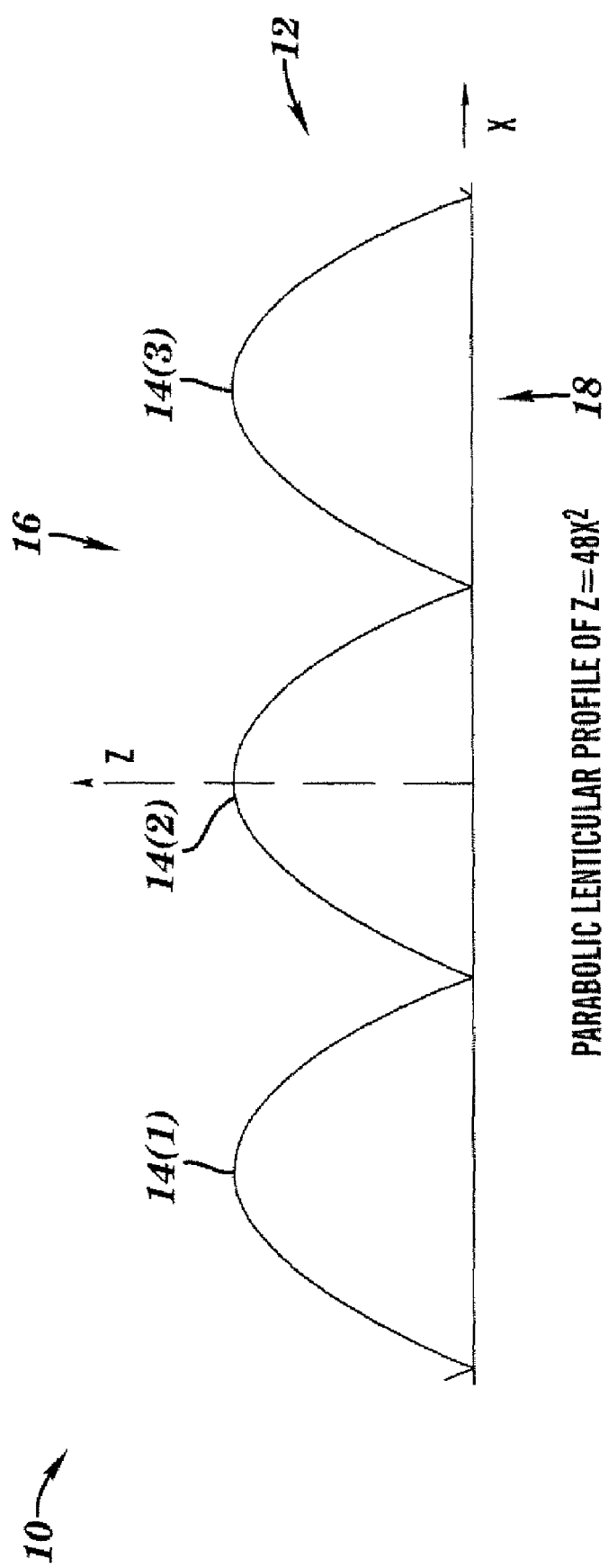
FIG. 1 is a cross-sectional view of an enlarged portion of a parabolic lenticular collimating film in accordance with embodiments of the present invention.
Figure 2:
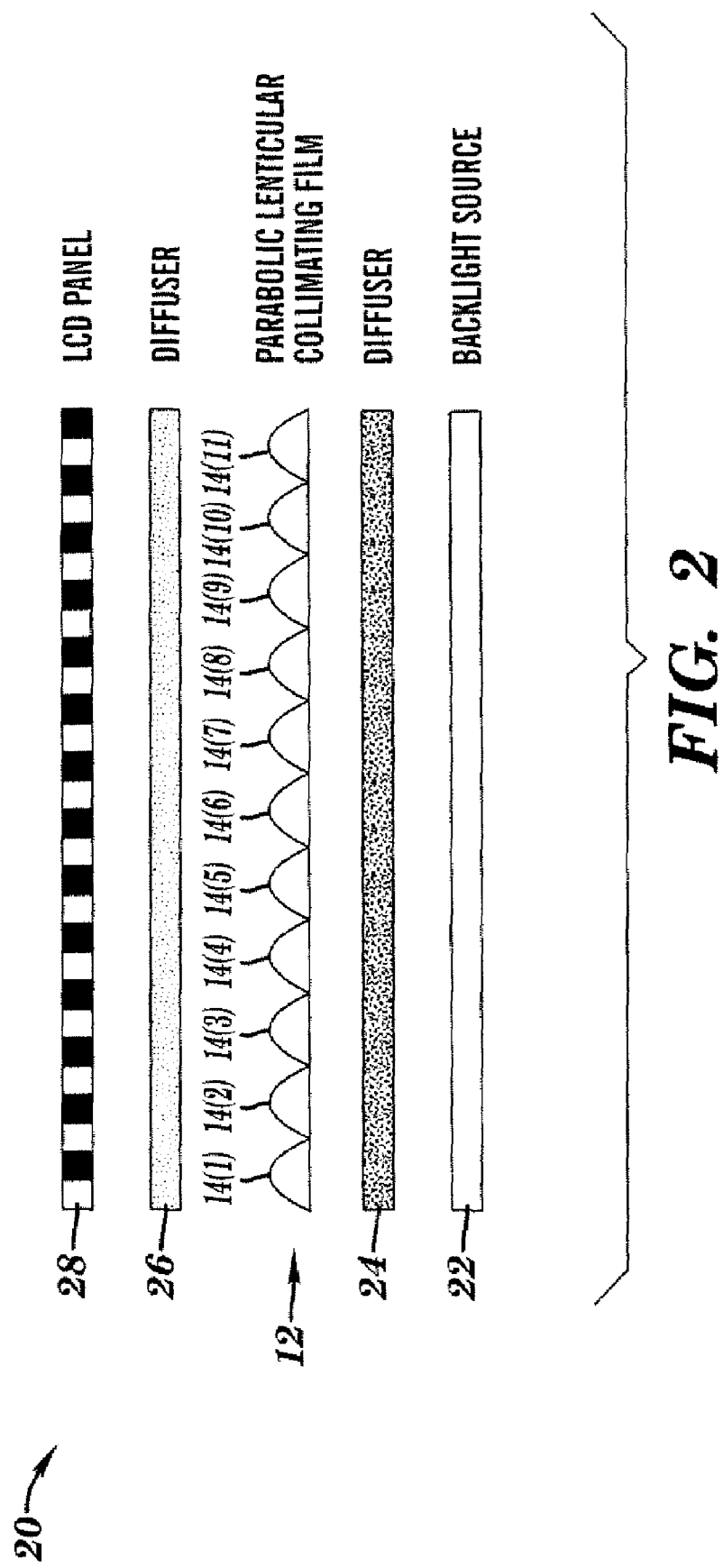
FIG. 2 is a cross-sectional view of a display system with a parabolic lenticular collimating film in accordance with embodiments of the present invention.

A parabolic lenticular collimating film system 10 in accordance with embodiments of the present invention is illustrated in FIGS. 1-2. The collimating film system 10 includes a film 12 which is at least partially transmissive and has one or more parabolic structures 14(1)-14(11) on a surface 16 of the film 12, although the collimating film system can comprise other numbers and types of elements and components in other configurations can be used. The present invention provides a number of advantages including providing a collimating film which efficiently produces an emission profile suitable for several types of applications, such as LCD televisions, where prism films have been deficient.

Referring more specifically to FIGS. 1 and 2, the film 12 is made of a transmissive material, although the film 12 could be made of other types and numbers of materials with other types of transmission properties which are at least partially transmissive. One surface 16 of the film 12 has the plurality of parabolic structures 14(1)-14(11) while an opposing surface 18 of the film 12 is substantially flat, although the surfaces of the film 12 could have other numbers and types of structures and shapes in other configurations.

The parabolic structures 14(1)-14(11) each have an outer cross-sectional shape which substantially matches a parabolic formula of $Z=A*X^2$, where Z represents the parabolic function and is in millimeters, X represents the cross dimension and is in millimeters and A represents parabolic constant. In these embodiments of the present invention, the parabolic constant A ranges between about 60 mm$^{-1}$ to about 30 mm$^{-1}$ to obtain emission profiles which improve open those which could be obtained with prism films, although A could have other ranges for other applications. Additionally, in these particular embodiments the parabolic structures 14(1)-14(11) have a pitch of about 50 µm and a peak to valley height of about 30 µm, although the structures could have other dimensions and shapes. As with other types of collimating films, the parabolic film also uses light recycling, and refraction, to obtain its output emission in manners well known to those of ordinary skill in the art.

Referring to FIG. 2, a display system 20 including a light source 22, diffusers 24 and 26, the parabolic lenticular collimating film system 10, and an LCD display panel 28 is illustrated, although the display system 20 can include other numbers and types of elements in other configurations. The parabolic lenticular collimating film system 10 is the same as described and illustrated with reference to FIGS. 1 and 2 and thus will not be described again here. The light source 22 is positioned to direct light towards the surface 18 of the parabolic lenticular collimating film system 10, although other numbers and types of light sources which direct light at the film 12 in other manners can be used. The diffuser 24 is located between the light source 22 and the parabolic lenticular collimating film system 10 and the diffuser 26 is located between the film 12 and the LCD display panel 28, although other numbers and types of diffuser and other components or elements in other locations and configurations could be used.

The operation of the display system 20 with the will now be described with reference to FIGS. 1-5. Light from the light source 24 is directed towards the diffuser 24 which diffuses the light through a series of stochastic surface features, although other types and numbers of diffusers can be used. The diffuse light from the diffuser 24 is directed towards the surface 18 of the parabolic lenticular collimating film system 10. Next, the diffuse light proceeds through the parabolic lenticular collimating film system 10 into another diffuser 26 which diffuses the light from the parabolic lenticular collimating film system 10 through a series of stochastaic surface features, although other types of diffusers can be used. The diffuse light from the diffuser 26 is directed towards the LCD display panel 28 to provide backlighting with an improved intensity profile when compared to prism films.

Figure 3:
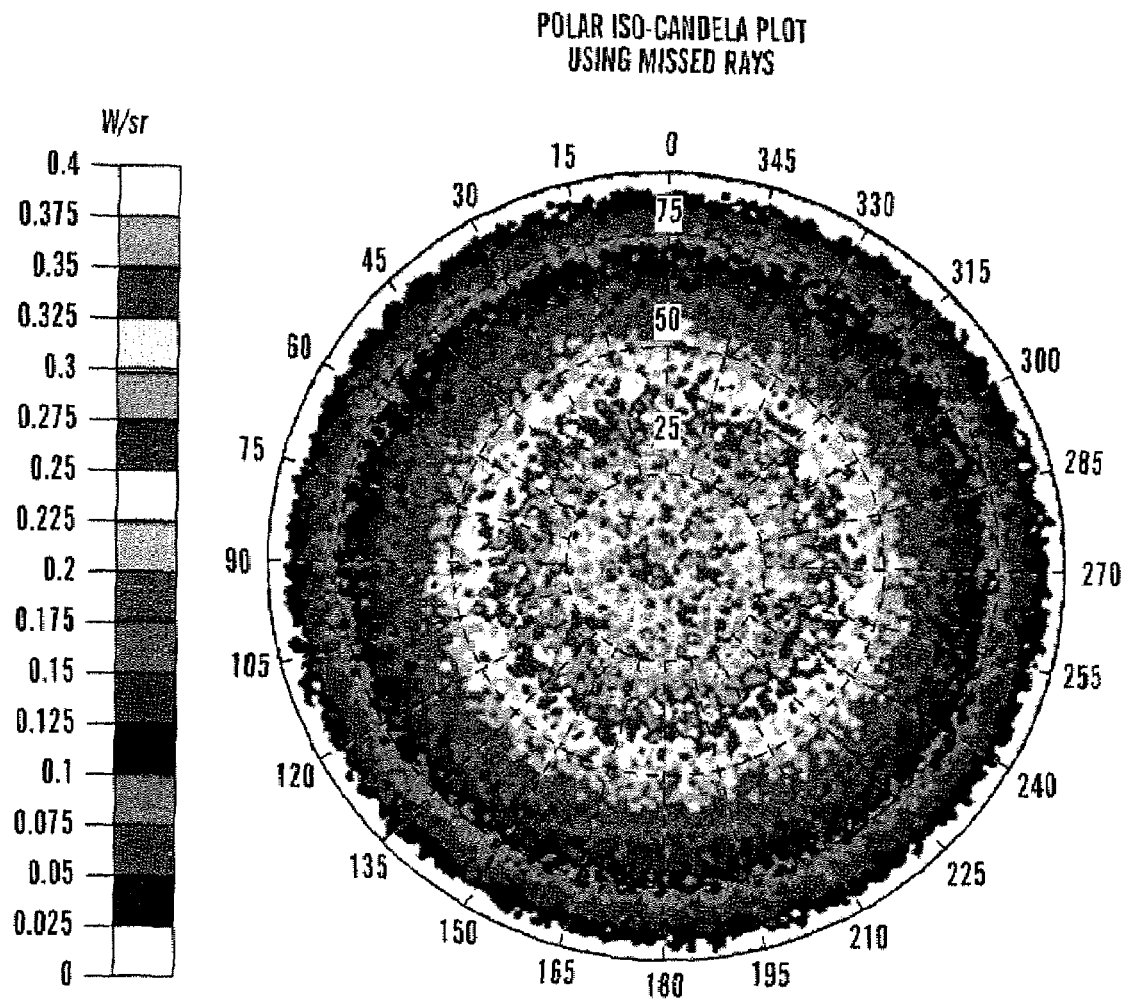
FIG. 3 is a diagram of an output from a prior art display system without a collimating film.
Figure 4:
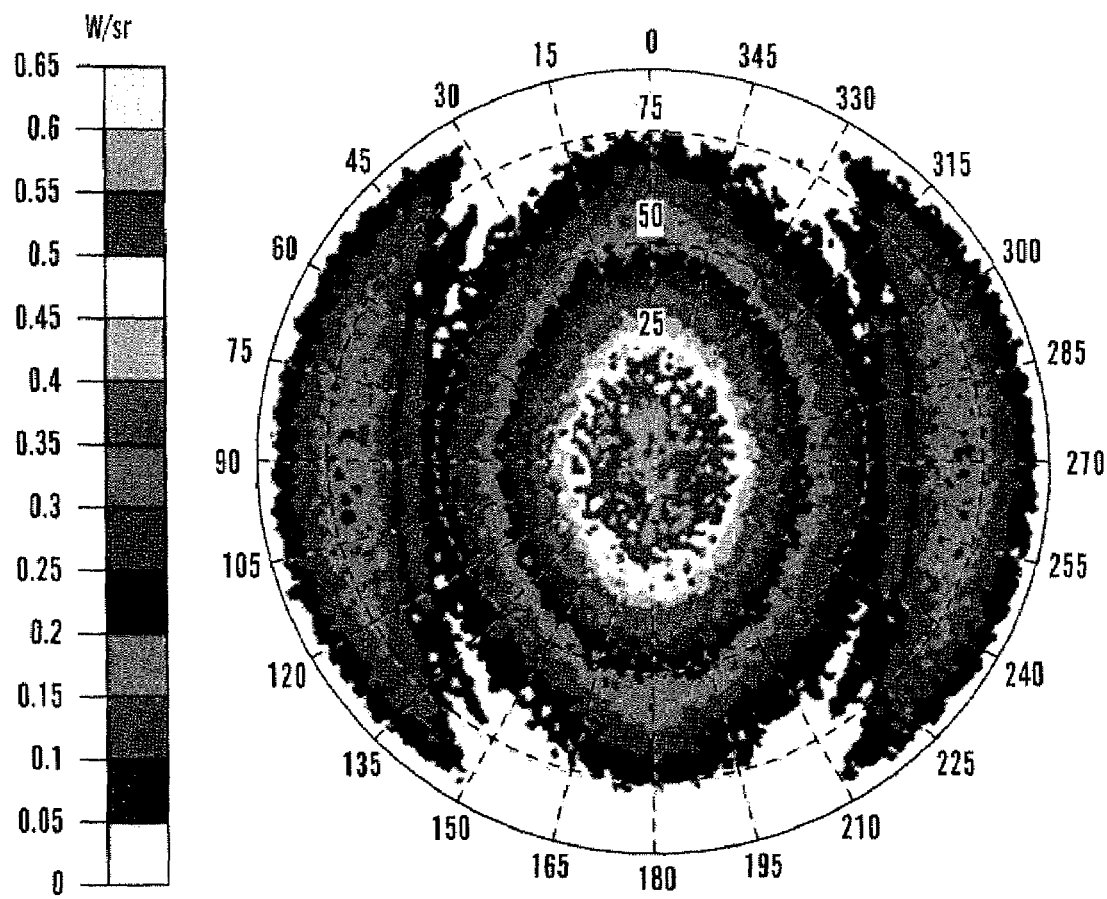
FIG. 4 is a diagram of an output from a display system with the parabolic lenticular collimating film in accordance with embodiments of the present invention.
Figure 5:
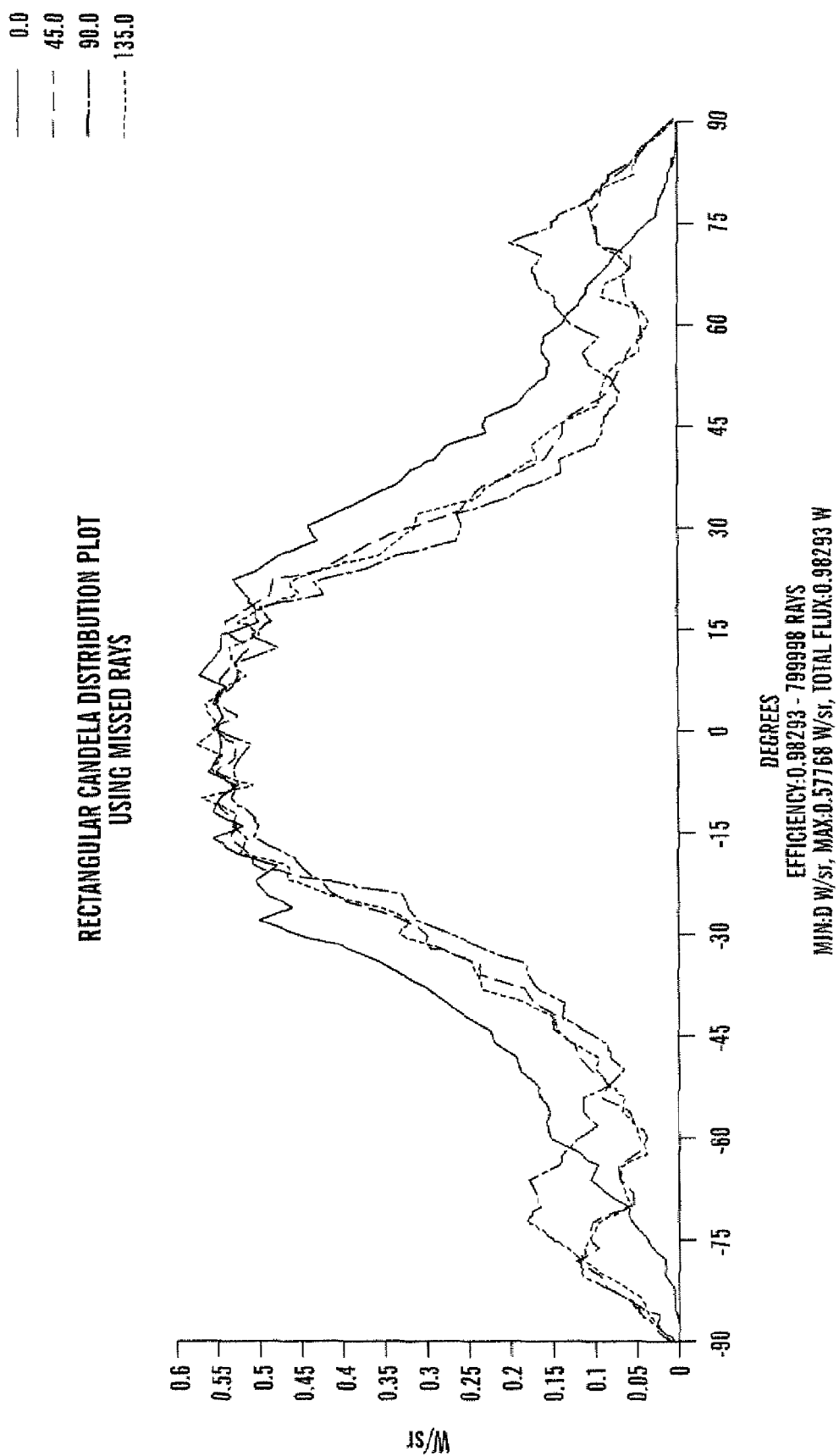
FIG. 5 is a graph of the output from a display system with the parabolic lenticular collimating film.

By way of example only, FIGS. 3-5 illustrate how the parabolic lenticular collimating film system 10 provides a significant improvement in backlighting over prior art prism films. Referring more specifically to FIG. 3, a baseline ray trace of the output of from a display system without the parabolic lenticular collimating film system 10 is illustrated. In comparison, a ray trace of the output from the display system 20 with the parabolic lenticular collimating film system 10 in accordance with embodiments of the present invention is illustrated in FIG. 4. Additionally, a rectangular-candela plot of the emission of the display system 20 with the parabolic lenticular collimating film 10 is illustrated in FIG. 5. As the ray traces and plot illustrate, the emission half angles are reduced from a symmetric ±60° with no parabolic lenticular collimating film system 10, down to ±41° H×±28.5° V with the parabolic lenticular collimating film system 10 in accordance with embodiments of the present invention. Additionally, the on-axis brightness has increased from 0.32 W/sr without the film, to 0.5 W/sr with the present invention which is a 50% increase.

Accordingly, as illustrated and described herein the present invention provides a collimating film which efficiently produces an emission profile suitable for several types of applications, such as LCD televisions, where prism films have been deficient

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A collimating film system comprising:
   at least one film which is at least partially transmissive; and
   one or more parabolic structures on a surface of the film wherein the one or more parabolic structures have an outer cross-sectional shape which substantially matches a formula of $Z=A^* X^2$ where Z represents a function for the one or more parabolic structures, X represents a cross dimension of the one or more parabolic structures, and A represents parabolic constant ranging between about 60 mm$^{-1}$ to about 30 mm$^{-1}$.

2. The system as set forth in claim 1 wherein the one or more parabolic structures have a pitch of about 50 μm and a peak to valley height of about 30 μm.

3. A display system comprising:
   at least one backlight source;
   at least one film which is at least partially transmissive adjacent the backlight source, the film having a surface with one or more parabolic structures wherein the one or more parabolic structures have an outer cross-sectional shape which substantially matches a formula of $Z=A^* X^2$ where Z represents a function for the one or more parabolic structures, X represents a cross dimension of the one or more parabolic structures, and A represents parabolic constant ranging between about 60 mm$^{-1}$ to about 30 mm$^{-1}$; and
   at least one display panel adjacent the at least one film.

4. The system as set forth in claim 3 wherein the one or more parabolic structures have a pitch of about 50 μm and a peak to valley height of about 30 μm.

5. The system as set forth in claim 3 further comprising at least one diffuser between the at least one backlight source and the at least one film.

6. The system as set forth in claim 5 further comprising another diffuser between the at least one film and the display panel.

7. A method for making a collimating film system, the method comprising:
   providing at least one film which is at least partially transmissive; and
   forming one or more parabolic structures on a surface of the film wherein the one or more parabolic structures have an outer cross-sectional shape which substantially matches a formula of $Z=A^* X^2$ where Z represents a function for the one or more parabolic structures, X represents a cross dimension of the one or more parabolic structures, and A represents parabolic constant ranging between about 60 mm$^{-1}$ to about 30 mm$^{-1}$.

8. The method as set forth in claim 7 wherein the one or more parabolic structures have a pitch of about 50 μm and a peak to valley height of about 30 μm.

9. A method of making a display system, the method comprising:
   positioning at least one film which is at least partially transmissive adjacent a backlight source, the film having a surface with one or more parabolic structures wherein the one or more parabolic structures have an outer cross-sectional shape which substantially matches a formula of $Z=A^* X^2$ where Z represents a function for the one or more parabolic structures, X represents a cross dimension of the one or more parabolic structures, and A represents parabolic constant ranging between about 60 mm$^{-1}$ to about 30 mm$^{-1}$; and
   positioning at least one display panel adjacent the at least one film.

10. The method as set forth in claim 9 wherein the one or more parabolic structures have a pitch of about 50 μm and a peak to valley height of about 30 μm.

11. The method as set forth in claim 9 further comprising positioning at least one diffuser between the at least one backlight source and the at least one film.

12. The method as set forth in claim 11 further comprising positioning another diffuser between the at least one film and the display panel.

* * * * *